United States Patent
Chen et al.

(10) Patent No.: US 11,685,008 B1
(45) Date of Patent: Jun. 27, 2023

(54) DODGE METHOD OF MACHINING PATH AND MACHINING SYSTEM

(71) Applicant: Industrial Technology Research Institute, Hsinchu (TW)

(72) Inventors: Chun-Ting Chen, Taichung (TW); Cheng-Wei Wang, Taipei (TW); Po-Hsun Wu, Taichung (TW); Chien-Chih Liao, Taichung (TW); Jen-Ji Wang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/704,038

(22) Filed: Mar. 25, 2022

(30) Foreign Application Priority Data

Feb. 8, 2022 (TW) .................................. 111104462

(51) Int. Cl.
*B23Q 15/12* (2006.01)
*G05B 19/404* (2006.01)

(52) U.S. Cl.
CPC ........... *B23Q 15/12* (2013.01); *G05B 19/404* (2013.01); *G05B 2219/36266* (2013.01)

(58) Field of Classification Search
None
See application file for complete search history.

(56) References Cited

U.S. PATENT DOCUMENTS

| | | | |
|---|---|---|---|
| 5,364,083 A | 11/1994 | Ross et al. | |
| 9,292,626 B2 | 3/2016 | Nelaturi et al. | |
| 10,228,681 B2 | 3/2019 | Legoupi et al. | |
| 2006/0261533 A1* | 11/2006 | Freeland | B23Q 1/035 269/266 |
| 2007/0020065 A1 | 1/2007 | Kirby | |
| 2009/0126187 A1 | 5/2009 | Kajiyama et al. | |
| 2011/0306985 A1 | 12/2011 | Inoue et al. | |
| 2015/0251315 A1* | 9/2015 | Brandenberger | G05B 19/4061 901/14 |

FOREIGN PATENT DOCUMENTS

| | | |
|---|---|---|
| CN | 105728938 | 7/2016 |
| CN | 104750025 | 4/2018 |
| CN | 109693044 | 6/2021 |
| JP | 4451708 | 4/2010 |
| TW | 201927497 | 7/2019 |
| TW | 201929997 | 8/2019 |

(Continued)

OTHER PUBLICATIONS

"Office Action of Taiwan Counterpart Application", dated Mar. 2, 2023, p. 1-p. 7.

(Continued)

*Primary Examiner* — Ryan A Jarrett
(74) *Attorney, Agent, or Firm* — JCIPRNET

(57) ABSTRACT

A dodge method of machining path and a machining system is provided. By inserting a flag into an original machining path, an interference between the flag and a suction cup of a support unit is determined. A coding instruction is inserted at the interference to edit the original machining path, thereby generating an edited machining path. Therefore, when a machining equipment executes the edited machining path, the support unit may smoothly dodge a knife of the machining equipment.

6 Claims, 6 Drawing Sheets

(56) References Cited

FOREIGN PATENT DOCUMENTS

TW          202038111          10/2020
TW            I717733           2/2021

OTHER PUBLICATIONS

Otto Jan Bakker et al., Recent Research on Flexible Fixtures for Manufacturing Processes, Recent Patents on Mechanical Engineering, Apr. 2013, pp. 1-25.

Chen Xu, "New Flexible Tooling for Carbon Fiber Components in Aircraft Assembly", Master's Thesis in the Master Degree Program, Production Engineering, Department of Product and Production Development Division of Production System, Chalmers University of Technology, 2013, pp. 1-49.

Kostyrka GmbH, "Universal Holding Fixture (UHF)", Kostyrka, 2015, pp. 1-7.

Ching-Rong Lee, "Parameters Identification of Flexibly Supported Composite Plate Structures", Dissertation Submitted to Department Mechanical Engineering College of engineering, National Chiao Tung University, Mar. 2006. pp. 1-104.

A. Gameros et al., "State-of-the-art in fixture systems for the manufacture and assembly of rigid ", International Journal of Machine Tools and Manufacture, Dec. 2017, pp. 1-21.

Hui Li et al., "Design and Application of Flexible Fixture", Procedia CIRP, Mar. 2016, pp. 528-532.

CMS Industries, "Flexible Equipment for the Machining of Aerospace Parts Made of Composite", Composites Forum, Nov. 29, 2016, pp. 1-55.

Chih-Ping Cheng et al., "Development of All Digital and Intelligent Domestic Multitasking Turning Center", Journal of the Mechatronic Industry, Nov. 2017, pp. 44-54.

* cited by examiner

DODGE METHOD OF MACHINING PATH AND MACHINING SYSTEM

CROSS-REFERENCE TO RELATED APPLICATION

This application claims the priority benefit of Taiwan application serial no. 111104462, filed on Feb. 8, 2022. The entirety of the above-mentioned patent application is hereby incorporated by reference herein and made a part of this specification.

TECHNICAL FIELD

The disclosure relates to a dodge method of machining path and a machining system, in particular to a dodge method of machining path and a machining system editing an original machining path.

BACKGROUND

Composite materials are widely used in automotive, aerospace, and marine industries due to their light weight and high strength. In the past, the composite parts were mostly fixed by fixed molds in the machining process. In the market of small quantity, diverse, and large thin parts, in addition to the need for special development of molds according to products, the process of disassembly and assembly of molds is also cumbersome, and mold storage requires a huge space. Especially in the machining of large parts as in ships and aerospace, the fixtures thereof are relatively large, resulting in high machining costs and insufficient production line flexibility.

Based on the shortcomings of fixed fixtures, flexible fixtures have gradually been developed, which may effectively improve the line change speed of a workpiece and reduce mold inventory costs.

However, if the machining equipment does not take into account the space of the support equipment before planning the machining path, the knife of the machining equipment may interfere and collide with the support unit of the machining equipment in the machining process.

Therefore, how to avoid the possible interference and collision of the knife with the support unit during the machining process is one of the issues to be solved by the industry.

SUMMARY

The disclosure provides a dodge method of machining path and a machining system, wherein in order to avoid the occurrence of interference and collision, in addition to taking into account the support equipment when planning a path, the machining path also needs to be edited. Therefore, an object of the present application is to increase the integration of the support equipment and the machining equipment and the editing means of the machining path.

An embodiment of the disclosure provides a dodge method of machining path, including: importing a machining path; setting a suction cup range of at least one support unit of a support equipment; inserting a flag at specific intervals on the machining path; determining each of the flags, wherein when the flag is inserted into the suction cup range of the at least one support unit, coordinates of the flag and a descend instruction related to the at least one support unit are edited to the machining path until another flag is out of the suction cup range of the at least one support unit, and the coordinates of the flag and an ascend instruction related to the at least one support unit are edited to the machining path; confirming whether the machining path is finished editing; and exporting an edited machining path.

Another embodiment of the disclosure provides a machining system, including: a support equipment having at least one support unit; and a machining equipment executing an edited machining path and connected with the support equipment in a two-way communication; wherein when the machining equipment executes a descend instruction related to the at least one support unit in the edited machining path, via the two-way communication, the at least one support unit executes the descend instruction until the machining equipment executes an ascend instruction related to the at least one support unit in the edited machining path, and via the two-way communication, the at least one support unit executes the ascend instruction whereby the at least one support unit completes a machining action of dodging the machining equipment.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
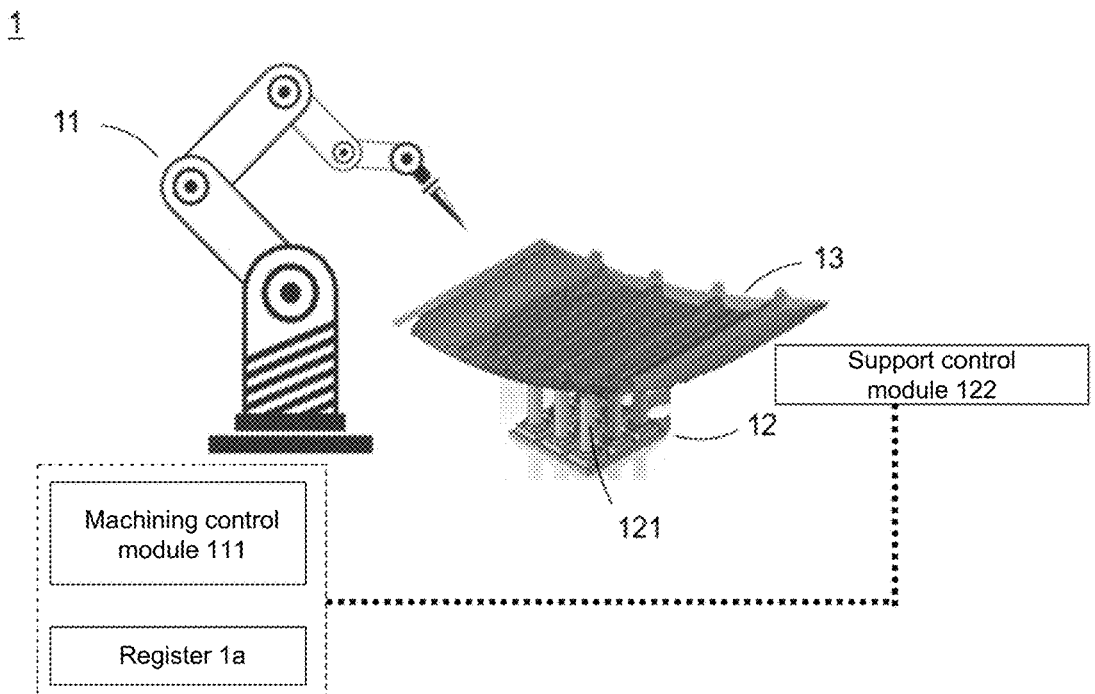
FIG. 1 is a schematic diagram of a machining system of the disclosure.

The specific embodiments of the disclosure will be further described below with reference to the accompanying drawings and embodiments. The following examples are used to more clearly illustrate the technical solutions of the disclosure, but may not limit the scope of the disclosure. Moreover, the same reference numerals are used to indicate the same or similar elements in all the figures.

FIG. 1 is a schematic diagram of a machining system of the disclosure. Please refer to FIG. 1, a machining system 1 of the present embodiment includes a machining equipment 11 and a support equipment 12. The machining equipment 11 may be, for example, a mechanical arm machining equipment configured to execute a machining path. The support equipment 12 has at least one support unit 121, for example, in the present embodiment, there may be a 2×3 total of 6 support units arranged to form the support equipment 12. In addition, the hardware architecture of the machining system 1 further includes a thin curved workpiece 13.

In the disclosure, a method of editing the original machining path is used, and the communication method between the machining equipment 11 and the support equipment 12 is used in conjunction to perform the knife dodge of the support unit 121 from the machining equipment 11. For the editing portion of the machining path, before the machining program is executed, the original machining path program code is edited in advance. The point of interference of the original machining path program code and the support unit 121 is determined, and when the knife of the machining equipment 11 enters the point of interference of the support unit 121, a descend instruction of the support unit 121 is inserted, and when the knife leaves the point of interference, an ascend instruction of the support unit 121 is inserted, so that the support unit 121 dodges the knife of the machining equipment 11. The following will further introduce the process of machining path editing.

Figure 2A:
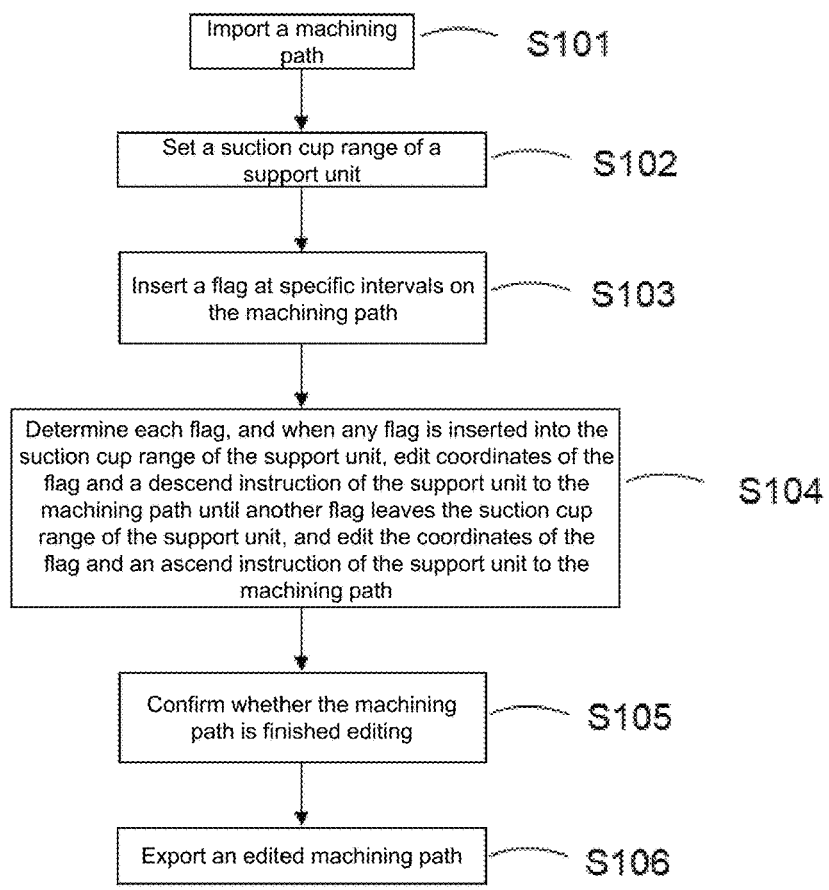
FIG. 2A is a flowchart of machining path editing of the disclosure.
Figure 4A:
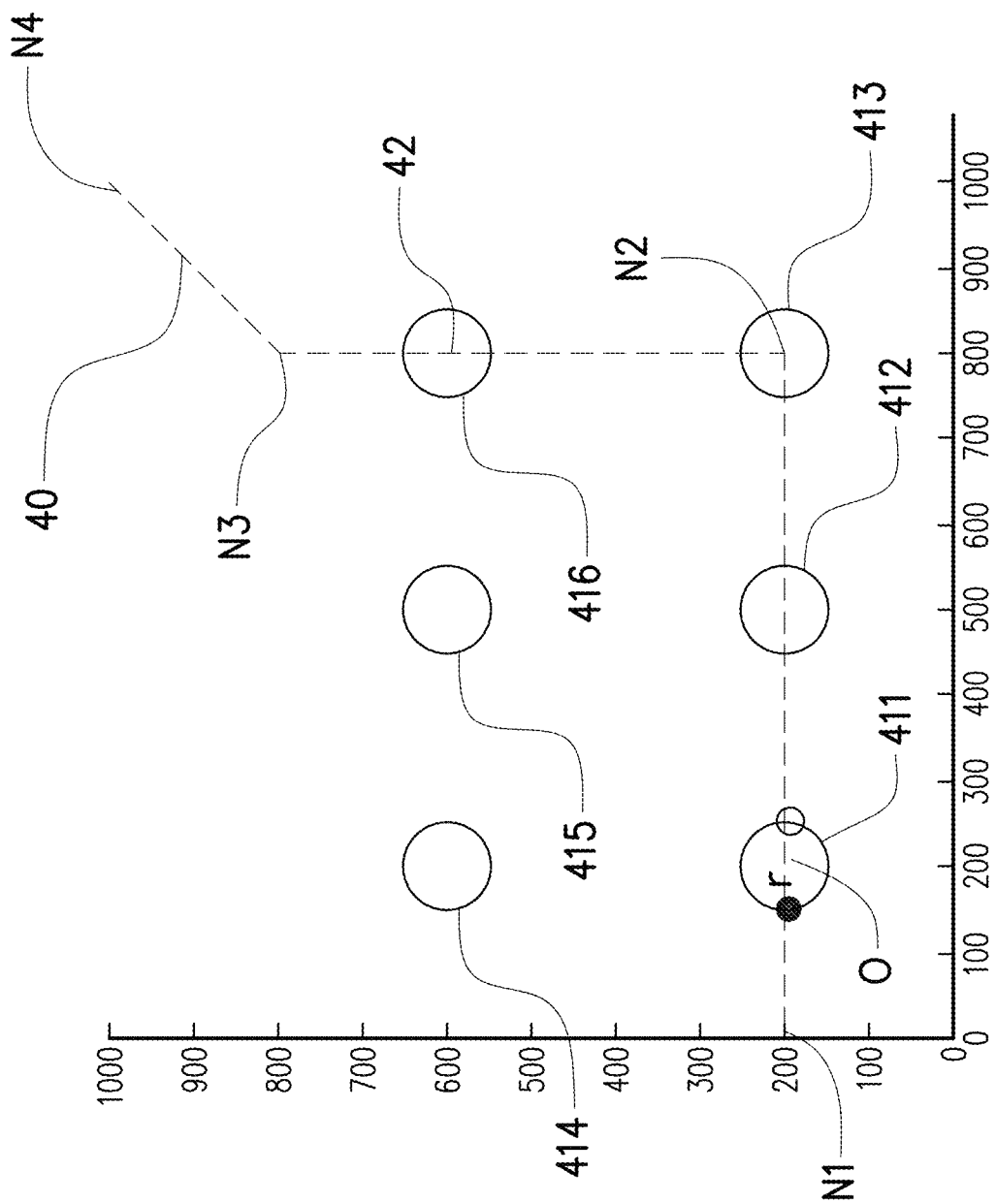
FIG. 4A is a schematic diagram of a plurality of support units and a machining path of a support equipment of the disclosure.
Figure 4B:
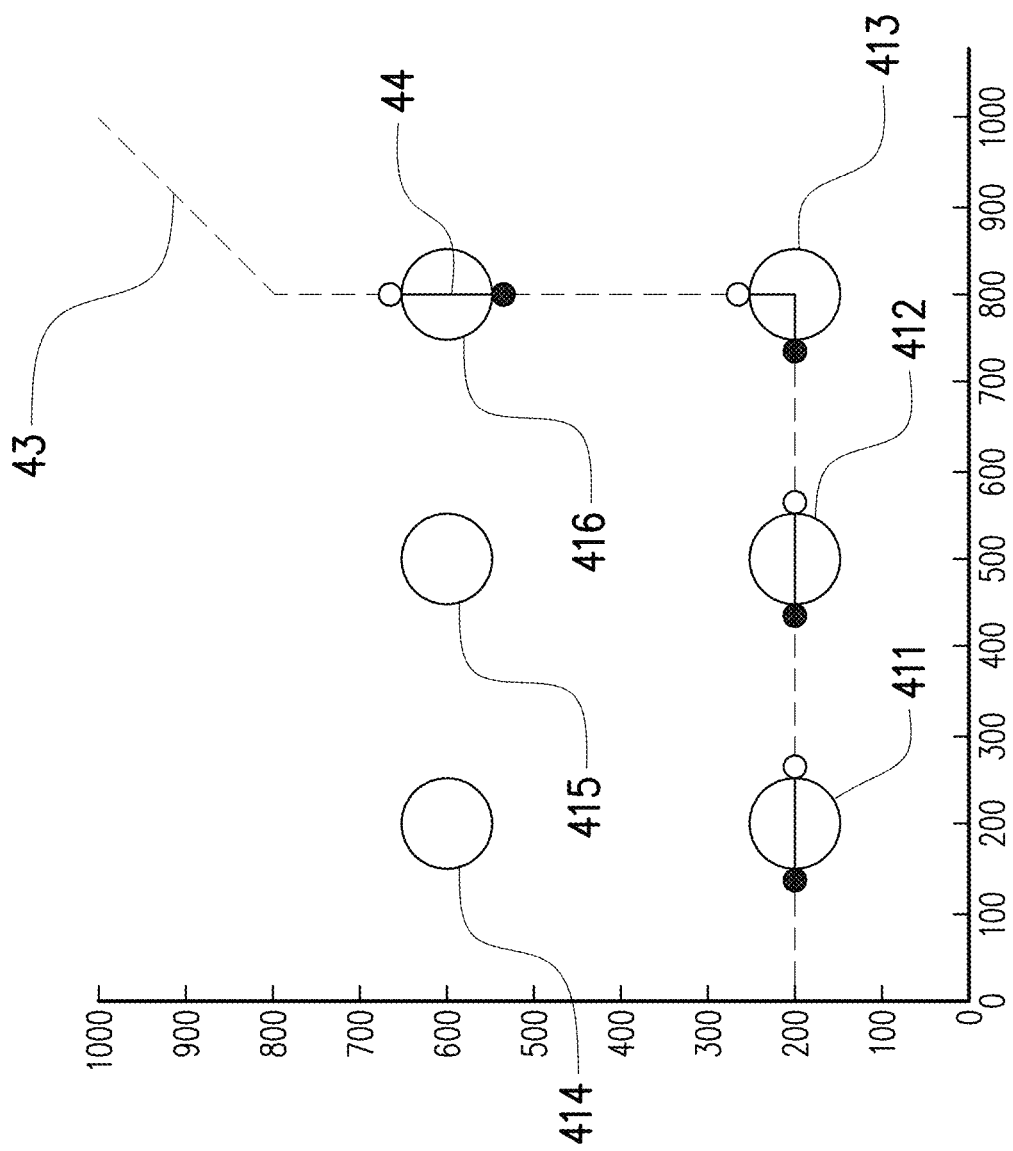
FIG. 4B is a schematic diagram of a plurality of support units and an edited machining path of a support equipment of the disclosure.

Please refer further to FIG. 1 in conjunction with FIG. 2A, FIG. 4A, and FIG. 4B. FIG. 2A is a flowchart of machining path editing of the disclosure, FIG. 4A is a schematic diagram of a plurality of support units and a machining path of a support equipment of the disclosure, and FIG. 4B is a schematic diagram of a plurality of support units and an edited machining path of a support equipment of the disclosure. First, in step S101, a machining path 40 is imported, as shown in FIG. 4A, the dashed line portion is used as an example of the path, which is the original machining path. In step S102, the suction cup range of the at least one support unit 121 of the support equipment 12 is set. In the present embodiment, for example, a suction cup range of 2×3 as shown in FIG. 1 with a total of 6 support units 121 is set. For the so-called suction cups, refer to suction cups 411, 412, 413, 414, 415, and 416 shown in FIG. 4A, wherein the suction cup range refers to each circular range. The suction cup of the present embodiment is first exemplified by a circular shape, but is not limited thereto. In step S103, a flag is inserted on the machining path 40 at specific intervals to determine whether the flag is inserted into the suction cup range during machining. In particular, the specific intervals may be 5 mm, but is not limited thereto. In step S104, each of the plurality of flags is determined. When the flag is inserted into the suction cup range of the at least one support unit 121, as in FIG. 4A, the flag is inserted into the range of the suction cup 411 of the support unit 121 (at the black dot), and at this time, the coordinates of the flag and a descend instruction related to the support unit 121 are edited into the machining path 40 until another flag leaves the range of the suction cup 411 of the support unit 121 (at the white dot). The coordinates of another flag and an ascend instruction related to the support unit 121 are edited to the machining path 40, so that when the machining system 1 is officially executed, the knife of the machining equipment 11 may smoothly dodge the suction cup 411 of the support unit 121. In step S105, whether the machining path 40 is finished editing is confirmed. In the present embodiment, since there are still the suction cups 412, 413, and 416 on the machining path 40 to be edited, after editing to the suction cup 416, whether the machining path 40 is finished editing is determined, wherein the editing method of each suction cup is as shown for the suction cup 411. Lastly, in step S106, an edited machining path 43 is exported, that is, as shown in FIG. 4B, an edited machining path code is obtained, wherein a solid line 44 portion indicates that the edited machining path 43 recorded the position of the suction cup.

In the present embodiment, after the suction cup range of the support equipment 12 is set in step S102, a single-segment separation is performed on the machining path 40. Taking FIG. 4A as an example, the machining path 40 may be divided into N1 (coordinates are X0 Y200 Z0), N2 (coordinates are X800), N3 (coordinates are Y800), N4 (coordinates are X1000 Y1000 Z0).

In step S104, furthermore, the suction cup center coordinates of the at least one support unit 121 are set. As illustrated in FIG. 4A, the center of the suction cup 411 of the support unit 121 is 0, when the coordinates of the flag are between a suction cup center O coordinates of the support unit 121, when the distance is less than or equal to a suction cup radius r of the support unit 121, the flag is determined as inserted into the suction cup range of the support unit 121, and when the distance between the coordinates of the flag and the suction cup center O coordinates of the support unit 121 is greater than the suction cup radius r of the support unit 121, the flag is determined as out of the suction cup range of the support unit 121. In the present embodiment, the suction cup radius of the support unit 121 is, for example, 50 mm.

Figure 4C:
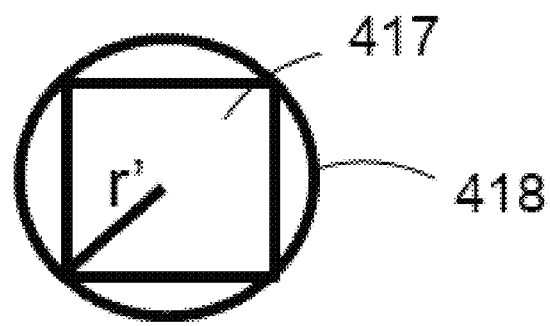
FIG. 4C is a schematic diagram of a support unit suction cup of the disclosure having a square shape.

In some embodiments, the suction cup shape may actually be a square, for example, as shown in FIG. 4C, which is a schematic diagram of the suction cup of the support unit of the disclosure being a square. When the suction cup 417 is a square, a radius r' of a circumscribed circle 418 may be obtained by planning the circumscribed circle 418, thereby determining whether the flag enters the circumscribed circle 418 of the suction cup 417. Therefore, regardless of the shape of the suction cup, the suction cup range may be avoided by the present embodiment.

Figure 2B:
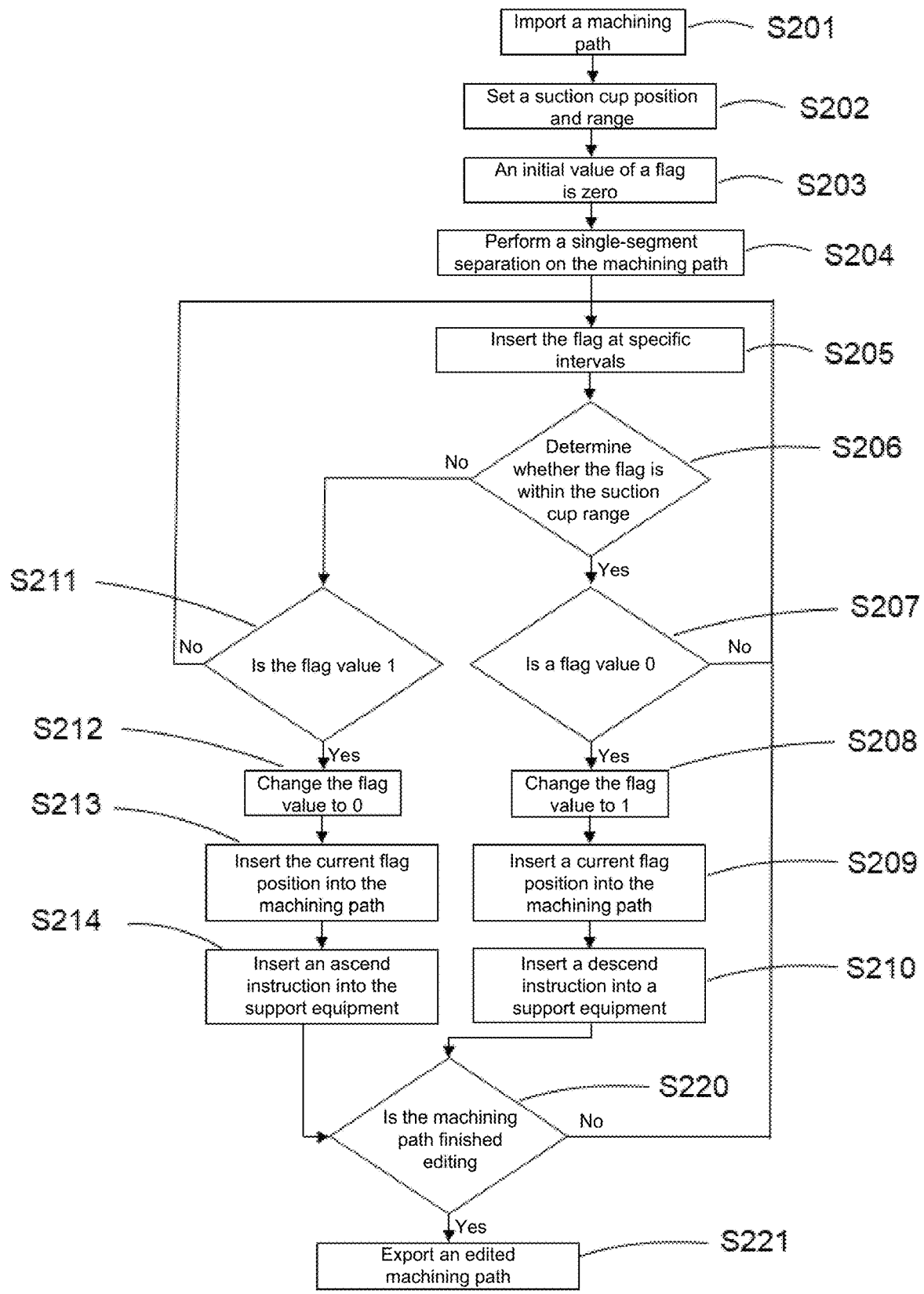
FIG. 2B is a detailed flowchart of machining path editing of the disclosure.

The method of dodging the machining path of the present embodiment will be described in detail below with reference to FIG. 2B in conjunction with FIG. 4A and FIG. 4B. FIG. 2B is a detailed flowchart of machining path editing of the disclosure. First, in step S201, the machining path 40 is imported. In step S202, the position coordinates and ranges of the suction cups 411, 412, 413, 414, 415, and 416 of each of the support units 121 are set. In step S203, the value of the initialization flag is set to 0. The insertion of the flag into the machining path 40 is to determine whether the flag is currently within or outside the range of the suction cup. If the flag is within the suction cup range, the value thereof is 1; otherwise, the value thereof is 0. The value of the flag is hereinafter referred to as the flag value. In step S204, single-segment separation is performed on the machining path 40, that is, the machining path 40 is divided into N1 (coordinates: X0 Y200 Z0), N2 (coordinates: X800), N3 (coordinates: Y800), and N4 (coordinates: X1000 Y1000 Z0). In step S205, inserting a flag at specific intervals is to finely insert the flag in a single segment, and the original single segment, such as N1, is divided into a plurality of single segments, and the number thereof is determined according to the moving distance of the single segment program. In step S206, interference determination is performed to determine whether the flag is within the suction cup range, and the determination method is to calculate whether the distance between the current fine insertion single segment and the suction cup center of each support unit is less than or equal to the radius of the suction cup range. If the distance is less than the suction cup radius, the flag is determined as entering the suction cup range, which may cause interference, and then step S207 is performed. In step S207, the determination of the flag value is performed, and if the flag value is 0, step S208 is performed. If the flag value is 1, the process reverts back to between steps S204 and S205, continuing from S205. In this step, the flag is used to determine whether the previous fine insertion single segment is already within the suction cup range. When the flag value is 0, the previous fine insertion segment is still outside the suction cup range. When the flag value is 1, the previous fine insertion single segment is already within the suction cup range. In the present application, the moment when the flag enters the suction cup range from outside the suction cup range or leaves the suction cup range is considered. Therefore, performing step S208 represents the moment when the flag enters the suction cup range from outside the suction cup range, and the flag value is changed to 1. In step S209, the current fine insertion single segment is inserted into the original machining path 40. In step S210, a descend instruction is inserted into the support equipment 12. For example, a coding instruction (M-code) commanding the support unit 121 of the support equipment 12 to descend is inserted into the original machining path 40. At this time, in step S220, whether the machining path 40 is finished editing is determined, and if not, step S206 is repeated. When the distances between all the fine insertion single segments and the suction cup centers of each support unit are greater than the suction cup radius, it means that currently the knife of the machining equipment 11 has not caused interference, and step S211 is performed. In step S211, the flag value is determined. If the flag value is 1, step S212 is performed; if the flag value is 0, the process reverts back to between steps S204 and S205, continuing from S205. As described in step S212, the present application is concerned with the moment when the flag enters or leaves the suction cup range. Therefore, if step S212 is performed, the flag is in the moment of leaving the suction cup range, and the value of the flag is changed to 0. In step S213, the current fine insertion single segment is inserted into the original machining path 40. In step S214, an ascend instruction is inserted into the support equipment 12. For example, a coding instruction (M-code) commanding the support unit 121 of the support equipment 12 to ascend is inserted into the original machining path 40. In step S220, whether the machining path 40 is finished editing is determined. If not finished, the process reverts back to between steps S204 and S205, continuing from S205. If editing is finished, step S221 is performed to export the machining path 43 that is finished editing.

Please refer further to FIG. 1. In the present embodiment, the machining equipment 11 is used to execute the edited machining path 43 and is connected with the support equipment 12 in two-way communication. In particular, when the machining equipment 11 executes a descend instruction related to the at least one support unit 121 in the edited machining path 43, via two-way communication, the at least one support unit 121 executes the descend instruction until the machining equipment 11 executes an ascend instruction related to the at least one support unit 121 in the edited machining path 43, and via two-way communication, the at least one support unit 121 executes the ascend instruction whereby the at least one support unit 121 completes the machining action of dodging the knife of the machining equipment 11.

In the present embodiment, the machining equipment 11 actually has a machining control module 111 configured to log into a register 1a and leave an instruction message of the descend instruction or the ascend instruction when the machining equipment 11 executes the descend instruction or the ascend instruction related to the at least one support unit 121 in the edited machining path 43. In the present embodiment, the support equipment 12 further has a support control module 122 configured to receive and read the instruction message of the register 1a, and log into the register 1a to leave a completion message when the instruction message is completed. Then, after the support control module 122 completes the instruction message related to the ascend instruction in the register 1a, the message record of the register 1a is cleared.

Figure 3:
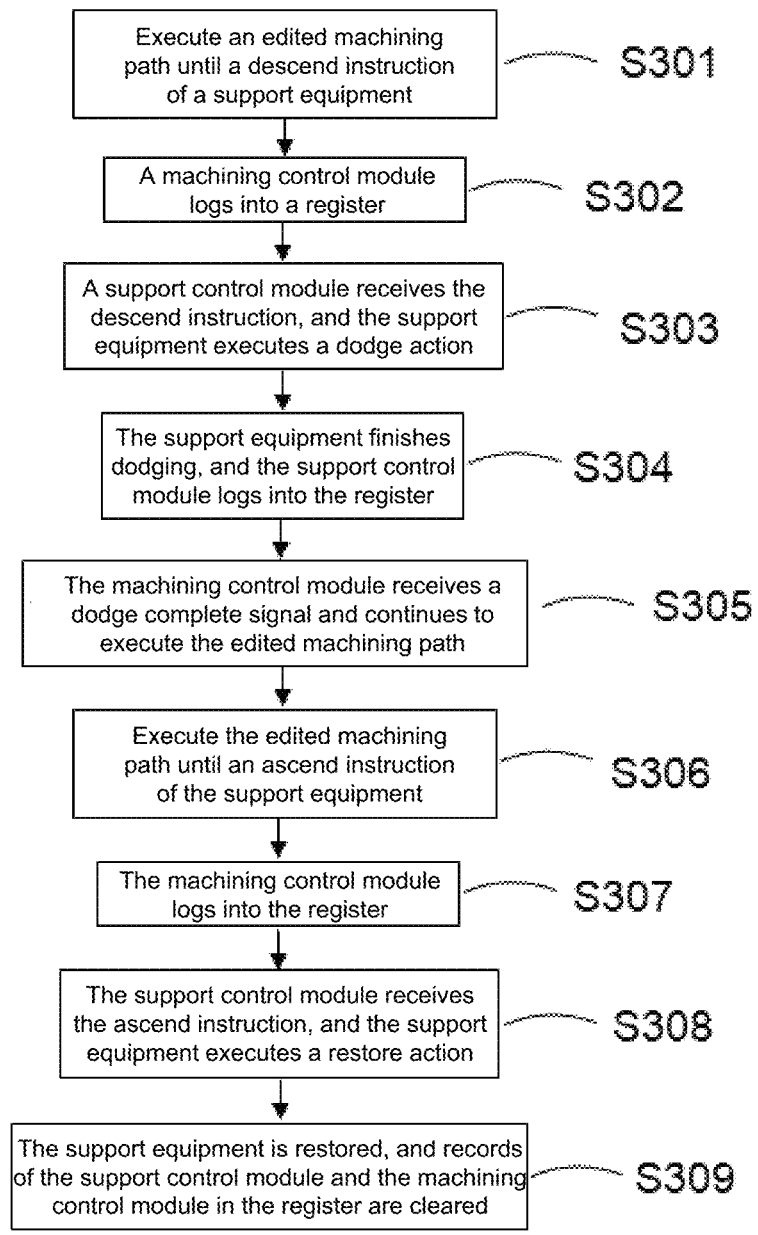
FIG. 3 is a flowchart of the operation of a machining system of the disclosure.

The process of executing the edited machining path will be described in detail below with reference to FIG. 3 in conjunction with FIG. 1. FIG. 3 is a flowchart of the operation of a machining system of the disclosure. The communication portions of the machining equipment 11 and the support equipment 12 communicate via an I/O port between the two equipment. The communication contents mainly include that the machining equipment 11 informs the support equipment 12 that a certain support unit needs to dodge, the support equipment 12 informs the machining equipment 11 after the dodge is completed, and the machining equipment 11 informs the support equipment 12 that the support unit may be restored. In step S301, when the machining equipment 11 executes the edited machining path 43, when the coding instruction (M-code) of the descend of a certain support unit is executed, the machining control module 111 of the machining equipment 11 logs into the register 1a in step S302 to leave a descend instruction message. In step S303, the support control module 122 is configured to receive and read the descend instruction message of the register 1a, so that the support unit corresponding to the support equipment 12 executes dodging. In step S304, after the support equipment 12 finishes executing the corresponding support unit dodging action, the support control module 122 logs into the register 1a to leave a completion instruction message. In step S305, the machining control module 111 receives the dodge complete instruction information left by the support control module 122, and then continues to execute the edited machining path 43. In step S306, when the machining equipment 11 executes the coding instruction (M-code) of the ascend of the support unit, the machining control module 111 of the machining equipment 11 logs into the register 1a in step S307 and leaves an ascend instruction message. In step S308, the support control module 122 receives and reads the ascend instruction message of the register 1a, so that the support unit corresponding to the support equipment 12 is restored. In step S309, the support unit finishes restoring, and the records of the support control module 122 and the machining control module 111 in the register 1a are cleared.

In the present embodiment, a number n of the register depends on a number m of the support unit to satisfy: n>log 2(m)+2. n−2 registers are used to represent the k-th support unit, and 1 register is used to inform the support control module 122 to read and execute the k-th support unit dodge action, that is, as in step S303, and another register is used to inform the support control module 122 to read and execute the k-th support unit restore action, that is, as in step S308.

The process of machining path editing and the operation process of the machining system will be described in detail again below. Please refer further to FIG. 4A and FIG. 4B in conjunction with FIG. 1. Referring to FIG. 4A, the machining path 40 is shown as a dotted line, and 411 to 416 represent the suction cups of the first to sixth support units 121, and the range is a circle. 42 is the area where the machining path 40 interferes with the suction cup 416, and there are a total of 4 locations in the present embodiment, namely 411, 412, 413, and 416. Therefore, the machining path 40 is edited, as illustrated in FIG. 2B. In step S204, the step of single-segment separation is to disassemble each single segment, and divide the machining path 40 into N1 (X0 Y200 Z0), N2 (X800), N3 (Y800), N4 (X1000 Y1000 Z0). In step S205, fine insertion is performed on a single segment, for example, fine insertion is performed on the first row of machining paths (N1, X0 Y200 Z0), and fine insertion is performed at specific intervals (for example, 5 mm). Therefore, after fine insertion, the single segments are: (G01 X0 Y0 Z0), (G01 X0 Y5 Z0) . . . (G01 X0 Y195 Z0), (G01 X0 Y200 Z0), wherein G01 represents one linear operation instruction. In step S206, interference determination is performed on each fine insertion segment, and whether the distance between the current fine insertion segment and the suction cup center O of each of the support units 121 is less than or equal to the radius of the suction cup range (the radius of the present embodiment is 50 mm) is calculated.

In the N1 single segment, all the fine insertion single segments are larger than the radius r of the suction cup range, so the single segment is not edited. In the N2 block, the fine insertion segments are: (G01 X0), (G01 X5) . . . (G01 X795), (G01 X800). In the (G01 X150) fine insertion single segment, the distance between the fine insertion single segment and the center O of the suction cup 411 of the first support unit 121 is less than or equal to the radius r of the suction cup range, and therefore step S207 is performed. Since the fine insertion single segment is the moment of entering the suction cup 411 range, the flag value is still 0, and therefore step S208 is performed to set the flag value to 1, indicating the flag inserted in the machining path 40 entered the suction cup 411 range. In step S209 and step S210, the current fine insertion single segment and the descend coding instruction (M-code) of the corresponding support unit (in the present embodiment, the M-code of the descend of the first support unit 121 is, for example, set to M100 and M103) are inserted into the machining path 40. The fine insertion single segments (G01 X155 to G01 X245) are all determined to have interference in step S206, but since the flag value is 1, in step S207, the fine insertion single segments (G01 X155 to G01 X245) are all determined to return to step S205 and do not proceed to steps S208 to 210 for any machining path editing. Up until the fine insertion single segment of (G01 X250), no interference is determined in step S206, and therefore step S211 is performed. Since the fine insertion single segment (G01 X250) is the moment of leaving the suction cup 411 range, the flag value remains 1, and step S212 is performed to set the flag value back to 0, indicating the fine insertion single segment (G01 X250) left the suction cup 411 range. In step S213 and step S214, the current fine insertion single segment and the ascend coding instruction (M-code) of the corresponding support unit (in the present embodiment, the M-code of the ascend of the first support unit 121 is, for example, set to M104) are inserted into the machining path 40. In step S220, whether the machining path 40 is finished editing is determined, if not, the above steps S203 to S214 are repeated to check whether there is still interference between the machining path 40 and the suction cups 411 to 416 range, and the machining path 40 is further edited, wherein the method of determining whether the machining path 40 is finished editing is to confirm whether the instruction G01 is already G00 (rapid movement instruction). G00 means that the editing is completed, and the edited machining path 43 is exported. The edited machining path 43 of the present embodiment is as shown in FIG. 4B, the dashed line of the edited machining path 43 becomes the solid line 44, and the edited machining path 43 is: (G01 G90 X0. Y200. Z0), (X150. M100 M103), (X250. M104), (X449.994 M101 M103), (X549.994 M104), (X749.994 M100 M101 M103), (X800), (Y250. M104), (Y550. M101 M102 M103), (Y650. M104), (Y800), (X1000. Y1000), wherein G90 is absolute coordinate programming, and M101 and M102 are coding instructions of a setting as mentioned above.

Please refer further to FIG. 1 in conjunction with FIG. 3. In actuality, in the machining path 43 edited by the machining equipment 11 (mechanical arm), if a coding instruction such as M101 M103 is encountered, step S302 is performed as in step S301 to log into the register 1*a*. In the present embodiment, M101 represents the coding instruction of the first support unit, and M103 represents the coding instruction of notifying the execution of a dodge signal. The coding instruction M101 is executed, and addresses R79.11 to R79.13 of the register 1*a* of the controller of the mechanical arm are logged as 0, 0, and 1 respectively. The coding instruction M103 is executed, and an address R79.14 of the register 1*a* of the controller of the mechanical arm is logged as 1. The mechanical arm and the I/O port of the support device 12 correspond to each other, input points 1100 to 1102 of the support control module 122 of the support equipment 12 are respectively connected to the addresses R79.11 to R79.13 of the register 1*a* of the mechanical arm, respectively, and an input point 1103 and the address R79.14 are connected to each other. Therefore, in step S303, after the input point 1103 of the support control module 122 receives the dodge signal notified by the machining control module 111, the information of the input points 1100 to 1102 is read, and it is determined that the first support unit needs to perform a dodge action. In step S304, the support unit of the support equipment 12 completes the dodge action, and the dodge action is completed by logging an output point O300, wherein the output point O300 of the support control module 122 and an address R77.10 of the machining control module 111 are connected to each other. Therefore, in step S305, the machining control module 111 receives a dodge complete action of the support control module 122, and continues to execute the edited machining path 43. In the machining path 43 in which the mechanical arm continues to execute the editing, when the coding instruction M104 is encountered, step S306 proceeds to step S307, and the register 1*a* is logged. In the present embodiment, M104 represents a coding instruction notifying the support equipment 12 to execute an ascend reply signal. The coding instruction M104 is executed, and an address R79.15 of the register 1*a* of the controller the mechanical arm is logged as 1. The input and output ports (I/O ports) of the mechanical arm and the support equipment 12 correspond to each other, and an input point 1104 and the address R79.15 are connected to each other. Therefore, in step S308, after the input point 1104 of the support control module 122 receives a restore signal notified by the machining control module 111, the information of the input points 1100 to 1102 is read, and it is determined that the first support unit needs to perform a restore action. In step S309, after the support equipment 12 completes the restoration, that is, an ascend action, the register record and the output point O of the support control module 122 and the machining control module 111 are cleared, and the edited machining path 43 is further executed until the next trigger of dodge and restore actions.

Based on the above, in the disclosure, the method of machining path editing is used in conjunction with the communication method between the machining equipment and the support equipment to perform the knife dodge of the support unit from the machining equipment. After the original machining path is obtained, the method of the present application may determine the point of interference with the suction cup and the point of separation interference of the original machining path and insert the coding instruction for descend of the support unit at the point of interference and insert the coding instruction for the ascend of the support unit at the point of separation interference. When the machining equipment executes the edited machining program, when a coding instruction is encountered, the support equipment is communicated via the I/O port, so that the support equipment learns that the support unit thereof needs to dodge. After the dodge is completed, the machining equipment is communicated, so that the machining equipment learns that the support equipment completes the dodge.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A dodge method of machining path, comprising:
   importing a machining path;
   setting a suction cup range of at least one support unit of a support equipment;
   inserting a flag at specific intervals on the machining path;
   determining each of the flags, wherein when the flag is inserted into the suction cup range of the at least one support unit, coordinates of the flag and a descend instruction related to the at least one support unit are edited to the machining path until another flag is out of the suction cup range of the at least one support unit, and the coordinates of the flag and an ascend instruction related to the at least one support unit are edited to the machining path;
   confirming whether the machining path is finished editing; and
   exporting an edited machining path.

2. The dodge method of machining path of claim 1, wherein after the suction cup range is set, a single-segment separation is performed on the machining path.

3. The dodge method of machining path of claim 1, wherein when setting the suction cup range of the at least one support unit, suction cup center coordinates of the at least one support unit are further set, when a distance between the coordinates of the flag and the suction cup center coordinates of the at least one supporting unit is less than or equal to a suction cup radius of the at least one support unit, the flag is determined as inserted into the suction cup range of the at least one support unit, and when a distance between the coordinates of the flag and the suction cup center coordinates of the at least one support unit is greater than the suction cup radius of the at least one support unit, the flag is determined as out of the suction cup range of the at least one support unit.

4. The dodge method of machining path of claim 3, wherein the suction cup radius of the at least one support unit is 50 mm.

5. The dodge method of machining path of claim 1, wherein a suction cup shape of the at least one support unit is a square or a circle.

6. The dodge method of machining path of claim 1, wherein the specific intervals are 5 mm.

* * * * *